United States Patent [19]
Fredley et al.

[11] Patent Number: 5,565,279
[45] Date of Patent: Oct. 15, 1996

[54] SYSTEM AND METHOD FOR PROVIDING OPTIMUM CELL OPERATING TEMPERATURES AND STEAM PRODUCTION IN A FUEL CELL POWER PLANT

[75] Inventors: Robert R. Fredley, Tolland; Paul R. Margiott, South Windsor; Karen L. Parenti, Glastonbury; Glenn W. Scheffler, Tolland, all of Conn.

[73] Assignee: International Fuel Cells Corp., So. Windsor, Conn.

[21] Appl. No.: 579,280

[22] Filed: Dec. 27, 1995

[51] Int. Cl.$^6$ .................................................. H01M 2/00
[52] U.S. Cl. ................................................ 429/26; 429/34
[58] Field of Search .................................... 429/24, 26, 34, 429/16, 17, 18, 19

[56] References Cited

U.S. PATENT DOCUMENTS

| | | | |
|---|---|---|---|
| 4,080,487 | 3/1978 | Reiser | 429/16 |
| 4,344,849 | 8/1982 | Grasso et al. | 210/662 |
| 4,706,737 | 11/1987 | Taylor et al. | 165/47 |
| 4,824,740 | 4/1989 | Abrams et al. | 429/24 |
| 4,826,741 | 5/1989 | Aldhart et al. | 429/19 |
| 5,462,817 | 10/1995 | Hsu | 429/19 |

*Primary Examiner*—Maria Nuzzolillo
*Attorney, Agent, or Firm*—William W. Jones

[57] ABSTRACT

The cell stack assembly of a fuel cell power plant is provided with a cooling system which provides optimum cell operating temperatures across each cell in the stack and also produces an optimum amount of steam. The cooling system includes at least one bypass through which a fraction of the coolant is fed from the coolant inlet side of the stack to the coolant outlet side of the stack. The bypass ensures that a fraction of the coolant is not heated to its target operating temperatures as it passes through the stack. This results in a more uniform cell operating temperature profile from the coolant inlet to the coolant outlet side of each cell; and also results in a lessening of excess steam production in the power plant.

6 Claims, 2 Drawing Sheets

SYSTEM AND METHOD FOR PROVIDING OPTIMUM CELL OPERATING TEMPERATURES AND STEAM PRODUCTION IN A FUEL CELL POWER PLANT

TECHNICAL FIELD

This invention relates to a system for cooling the cell stack assembly of a fuel cell power plant, which system produces more uniform and optimum cell operating temperatures across each cell, and also results in the production of a more optimal amount of steam in the coolant system.

BACKGROUND ART

Fuel cell power plants include one or more stacks of electrochemical cells which are operable to convert certain reactants to DC electrical power. The more common types of fuel cell power plants such as acid electrolyte cells utilize hydrogen derived from a hydrocarbon fuel such as natural gas, and oxygen typically derived from air, as the active ingredients in producing the electrical power. The reaction which occurs in each cell in a fuel cell power plant produces electric power, water and heat. In order to perform optimally, the fuel cells in the power plant should be operated at an optimal temperature which is nearly uniform across each cell in the stack. This temperature can theoretically be achieved by selecting the proper coolant and using the selected coolant to maintain the proper cell operating temperature.

Present day, larger capacity fuel cell stack assemblies use water-based coolants to control cell operating temperatures. The coolant must be able to prevent the cells from overheating, and at the same time, allow them to operate at high enough temperatures needed to make efficient use of the reactant supply. The ideal situation is to use a water-base coolant which will be converted to steam, or a mixture of steam and water at the optimum operating temperature of the stack cells. Achieving such ideal results can, however, increase power plant cost due to the need to include excessive or complex heat exchangers in the coolant loop to properly control the temperature of the coolant. The coolant composition can be varied so as to vary their boiling points; for example, cells operating at higher temperatures can be cooled with a mixture of water and a higher temperature boiling point liquid, such as glycol, or the like, in appropriate proportions. Likewise, cells operating at lower temperatures can be cooled with water that is essentially devoid of the higher temperature boiling point components. Regardless of what the exact composition of the coolant is, it is still desirable to bring the coolant to its boiling point as soon as possible after it enters the active area of the stack.

A problem which can occur in certain fuel cell power plants, which may depend on the ambient temperature at which they operate, is that when one achieves the aforesaid goal of boiling the coolant as soon as possible after it enters the actual area of the stack, the result may be to produce an excessive amount of steam in the coolant stream as it leaves the actual area of the stack. Since the coolant loop of a fuel cell power plant is essentially a closed loop, any steam produced will have to be condensed back to a liquid state, used in the steam reformer portion of the power plant, and vented into the ambient surroundings. Once again, the production of excess amounts of steam in order to accomplish the uniform cell temperature objective will add to cost of the power plant due to the need to recondense or purge the steam thus created. It will be appreciated from the aforesaid that the only steam that is produced during cell cooling that can be of direct benefit to the operation of the fuel cell stack is that used to reform the natural gas stream. In certain cases it would, therefore, be highly desirable to have a cell stack cooling system which would ensure quick boiling of the coolant as it enters the active area of the stack, while at the same time, would ensure the production of an amount of steam in the coolant leaving the active area of the stack necessary to operate the power plant steam reformer.

DISCLOSURE OF THE INVENTION

This invention relates to a fuel cell power plant, and more particularly, to a cooling system for the cell stack assembly, which cooling system will provide a more constant cell temperature profile and will result in the production of an optimum amount of steam. The cooling system of this invention utilizes a predetermined amount of a preferably water-based coolant, such as water or a water-glycol mixture, which is recirculated through an essentially closed loop. In a typical phosphoric acid fuel cell stack producing 200 kilowatts of power, the coolant stream enters the cells in the stack at a temperature of about 300° F. and exits the cells at a temperature of about 345° F. The coolant flowing through the cooling passages in each cell assembly is brought up to the exit temperature in a minimum amount of time through the inclusion in the coolant loop of a coolant bypass conduit which allows a predetermined portion of the total amount of coolant to bypass the cells. In this way, a lesser percentage of the total coolant in the loop is actually used to cool the cells than would be the case without the bypass conduit. Since a smaller proportion of coolant flows through the coolant passages in each cell assembly, the coolant in the cell area will be brought up to the target cooling operating temperatures more rapidly, i.e., closer to the inlet side of the coolant passages in each cell. This being the case, more steam will be produced in the coolant passages of the cells, and will thus be ejected into the exit leg of the coolant loop. However, at the same time, the portion of the coolant which flows through the bypass will not be heated to its boiling point, and thus when it flows into the exit leg of the coolant loop, it will condense a sufficient amount of the steam in the exit leg of the cooling loop so as to minimize the need for steam condensing heat exchangers in the cooling system. The amount of steam remaining in the exit leg of the coolant loop can be relatively accurately controlled by circulating the proper percentage of the total coolant supply through the bypass conduit. This percentage can be achieved and controlled statically simply by providing an appropriately sized bypass conduit with an appropriate length.

It is therefore an object of this invention to provide a fuel cell power plant cell stack assembly cooling system which is operable to establish a more constant cell temperature profile so as to improve operation of the power plant.

It is a further object of this invention to provide a cooling system of the character described which can be tailored to produce an optimum amount of steam for use by the power plant.

It is another object of this invention to provide a cooling system of the character described which does not require adjustable controls for proper operation.

It is an additional object of this invention to provide a cooling system of the character described which minimizes the number of heat exchangers required to properly operate the power plant.

BEST MODE FOR CARRYING OUT THE INVENTION

Figure 1:
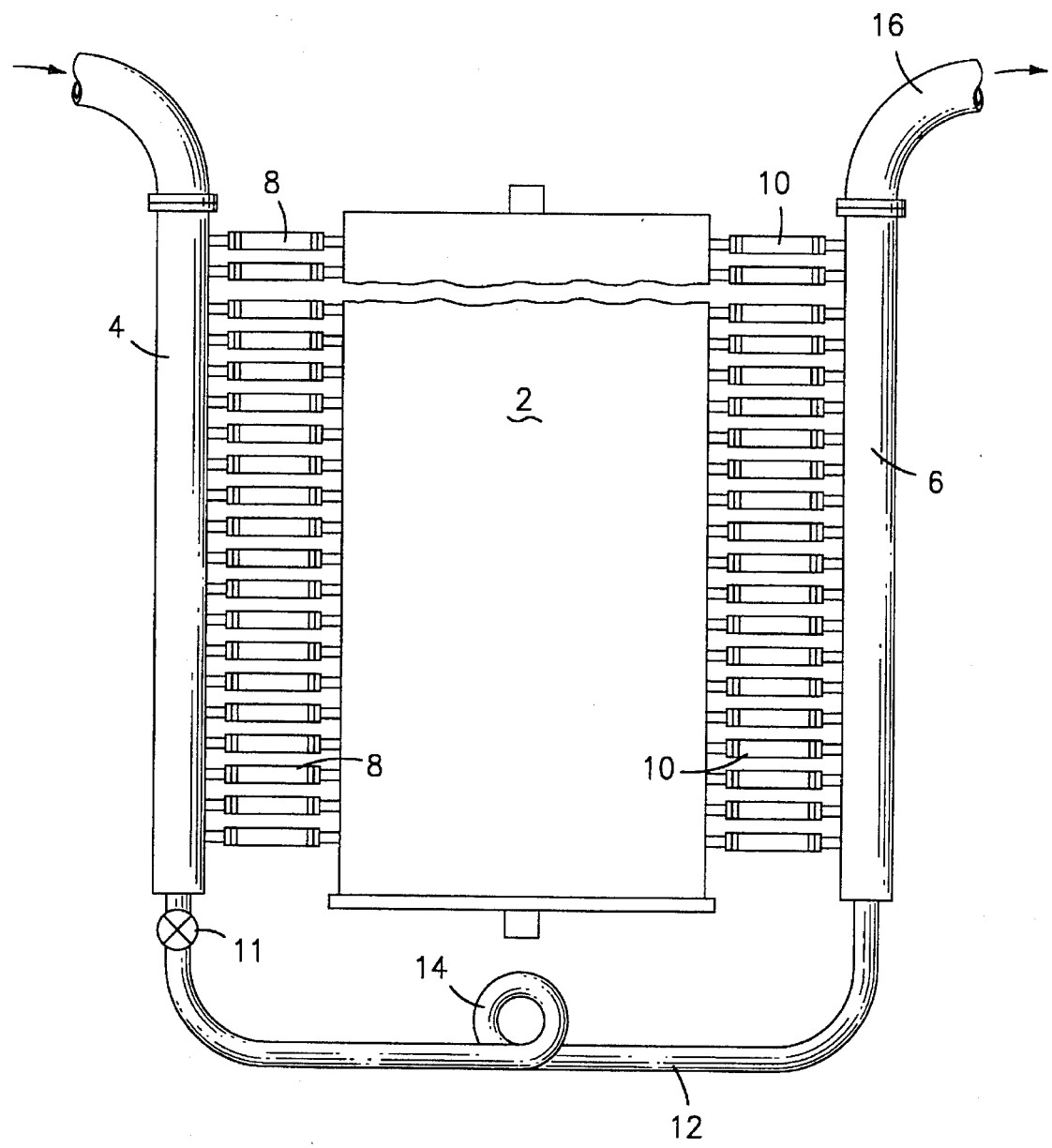
FIG. 1 is a fragmented side elevational view of a cell stack assembly portion of a fuel cell power plant, which stack assembly is cooled by a system formed in accordance with this invention.

Referring now to FIG. 1, there is shown the cell stack assembly portion of a fuel cell power plant which operates generally as set forth in U.S. Pat. No. 4,824,740, granted Apr. 25, 1989 to M. L. Abrams, et al., the disclosure of which is incorporated herein by reference. The stack assembly is denoted generally by the numeral 2, and is made up of a plurality of fuel cell assemblies which are stacked, one atop another. The cells in the stack assembly 2 are individually cooled by a water or water-glycol coolant which is circulated through coolant passages interposed between adjacent cells in the stack assembly 2. The coolant is recirculated through the power plant by a coolant loop. The pertinent portions of the coolant loop shown in FIG. 1 are the coolant inlet leg 4 and the coolant outlet leg 6.

By way of example, the power plant shown in the drawings may be a plant which produces 200 kilowatts of power during peak operating periods. At full power, the cells in the stack assembly 2 will preferably operate at a temperature between about 350° F. and 430° F. The coolant in the inlet leg 4 will preferably have a temperature of about 300° F. The coolant flows from the inlet leg 4 into the individual coolant passage through inlet conduits 8. The coolant then flows transversely through the cell coolant passages toward outlet conduits 10 which lead to the outlet leg 6 of the coolant loop. It will be appreciated that the temperature of the coolant will rise from its entry temperature to its exit temperature as the coolant moves from the entry conduits 8 to the exit conduits 10. It is desirable to be able to heat the coolant up to its exit temperature, which provides the optimum operating temperature of the cells in the stack assembly 2, as soon after entering the active area of the cells as possible. It is apparent that the stack assembly 2 will have a particular number of cells so as to enable the production of the amount of power that it is designed to produce. If for example, the stack assembly were to have one hundred cells, then one percent of the total amount of coolant in the cooling system would flow through each of the cell cooling channels. The instant cooling system includes a bypass conduit 12 through which an appropriate fraction of the total coolant in the coolant loop will flow from the inlet leg 4 to the outlet leg 6. The inclusion of the bypass conduit 12 lowers the amount of coolant which flows through each of the cell cooling channels, thereby lowering the time period needed to heat the coolant from its entry temperature to its exit temperature. In this manner, a greater proportion of each cell in the stack assembly 2 will operate at optimal temperatures, the cell stack assembly 2 will operate more efficiently in producing electrical power.

When a lesser amount of coolant liquid is passed through each cell assembly as described above, the coolant boiling begins sooner and to a greater degree, thus producing more steam than when a larger amount of coolant is passed through each cell assembly. When the steam-coolant mixture reaches the outlet leg 6 of the coolant loop, the steam-coolant mixture will be admixed in an outlet leg stream which will include the fraction of total coolant which flows through the bypass conduit 12, and thus remains liquid when it enters the outlet leg 6. The admixture of bypass liquid coolant with the steam-liquid mixtures exiting from the cells will hasten condensation of the steam fraction of the steam-liquid mixture so that the desired amount of steam needed for other aspects of power plant operation will remain in the outlet leg coolant-steam mixture when the latter flows through an outlet leg elbow 16. This amount of steam could be merely enough to operate the power plant's steam reformer; or could be enough to operate the reformer plus contribute to the heating of a building or the like with which the power plant is associated, or for any other useful purpose one desires. As previously noted, one way to produce the desired amount of steam and the desired cell temperature profile is to control the diameter and/or length of the bypass conduit 12. In the event that a given bypass conduit diameter will not produce the desired result, one can utilize a loop 14, a serpentine configuration, or any number of other known methods to adjust the effective length of the bypass conduit 12. An adjustable trim valve 11 could also be employed to allow setup and trimming over the operating life of the cell stack.

Figure 2:
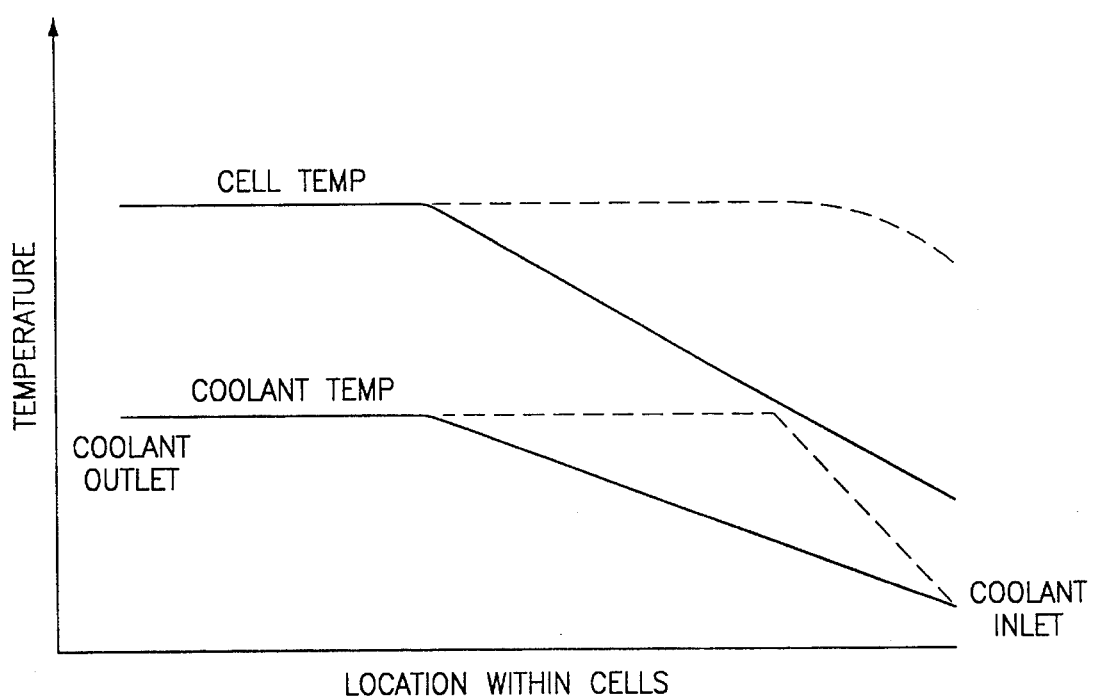
FIG. 2 is a cell stack assembly temperature profile illustrating transverse cell and coolant temperatures for a stack assembly with and without a coolant bypass.

FIG. 2 is a cell and coolant temperature profile graph as seen across the cells from the coolant inlet side to the coolant outlet side thereof. In the profile graph, the abscissa or X axis indicates location points between the coolant inlet and outlet sides of the cells; and the ordinate or Y axis indicates the temperature of the cell and coolant. The cell and coolant temperature profile depicted in FIG. 2 as broken lines is the profile which will result when there is a coolant bypass in the cooling system, and that depicted in solid lines is that which results when the bypass is not present in the system. It will be noted that with no bypass in the system, the temperature of the cells on the coolant inlet side will be lower than the same cell side temperatures when the coolant bypass is included. The reason for this difference is that when there is no bypass, the mass of coolant entering the active area of the cells is greater than when the bypass is present. Thus the cell temperature will be proportionally lowered. It will also be noted that the average cell operating temperature is greater when the bypass is present, thus the cells will perform at temperatures which are closer to ideal cell operating temperatures.

It will be readily appreciated that a cell stack assembly which is equipped with a cooling system formed in accordance with this invention will enable the cell stack assembly to produce a desired amount of steam, while also providing the cells with an average operating temperature across the cells which is closer to the optimum cell operating temperature. The power plant cooling system can also be simplified so as to include fewer heat exchangers.

Since many changes and variations of the invention may be made without departing from the inventive concept, it is not intended to limit the invention otherwise than as required by the appended claims.

What is claimed is:

1. A system for cooling a fuel cell stack with an aqueous-based coolant, said system comprising:

a) a coolant inlet line for admitting said coolant to the stack;

b) a coolant outlet line for removing said coolant from the stack;

c) a plurality of coolant inlet conduits connecting cells in said stack with said coolant inlet line;

d) a plurality of coolant outlet conduits connecting cells in said stack with said coolant outlet line; and e) a coolant bypass conduit for bypassing cells in said stack and directly interconnecting said coolant inlet line with said coolant outlet line, said coolant bypass conduit being operable to transfer a portion of the total coolant in said system directly from said coolant inlet line to said coolant outlet line.

2. The system of claim 1 further comprising a variable valve in said coolant inlet line for varying the amount of coolant transferred from said coolant inlet line into said coolant bypass line.

3. The system of claim 1 further comprising means in said coolant bypass line which is operable to control the amount of coolant that is transferred through said coolant bypass line.

4. The system of claim 3 wherein said means in said coolant bypass line is a loop in said coolant bypass line.

5. A method for cooling a fuel cell stack with an aqueous-based coolant, said method comprising the steps of:

a) passing a first fraction of the coolant in said system from a coolant inlet line in the stack through fuel cells in the stack to a coolant outlet line in the stack so as to form a water-steam coolant mixture in the cells, and in the coolant outlet line; and b) passing a second fraction of the coolant in said system directly from the coolant inlet line in the stack to the coolant outlet line in the stack, and around the cells, so as to form a steam-free coolant stream entering the coolant outlet line, which steam-free coolant stream condenses a portion of the steam fraction of the water-steam coolant mixture in the coolant outlet line.

6. The method of claim 5 further comprising the step of controlling the amount of the second fraction of the coolant in said system so as to form a water-steam coolant mixture in the coolant outlet line which includes essentially only enough steam needed to operate a steam reformer in the fuel cell power plant.

* * * * *